(12) United States Patent
Chae et al.

(10) Patent No.: US 12,205,342 B2
(45) Date of Patent: *Jan. 21, 2025

(54) DEVICE AND METHOD FOR GENERATING SPEECH VIDEO

(71) Applicant: DEEPBRAIN AI INC., Seoul (KR)

(72) Inventors: Gyeongsu Chae, Seoul (KR); Guembuel Hwang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 365 days.

This patent is subject to a terminal disclaimer.

(21) Appl. No.: 17/763,243

(22) PCT Filed: Dec. 15, 2020

(86) PCT No.: PCT/KR2020/018374
§ 371 (c)(1),
(2) Date: Mar. 24, 2022

(87) PCT Pub. No.: WO2022/045486
PCT Pub. Date: Mar. 3, 2022

(65) Prior Publication Data
US 2022/0375190 A1    Nov. 24, 2022

(30) Foreign Application Priority Data

Aug. 25, 2020   (KR) .......................... 10-2020-0107191

(51) Int. Cl.
*G06V 10/44*        (2022.01)
*G06T 13/20*        (2011.01)
*G06V 40/16*        (2022.01)

(52) U.S. Cl.
CPC .......... *G06V 10/454* (2022.01); *G06T 13/205* (2013.01); *G06V 40/169* (2022.01)

(58) Field of Classification Search
CPC .... G06V 10/454; G06V 40/169; G06V 10/82; G06V 40/171; G06T 13/205;
(Continued)

(56) References Cited

U.S. PATENT DOCUMENTS

2020/0135172 A1    4/2020   Chen et al.
2022/0351348 A1*   11/2022  Chae .................. G06N 3/094
(Continued)

FOREIGN PATENT DOCUMENTS

KR    10-2006-0090687 A    8/2006
KR    10-2014-0037410 A    3/2014
(Continued)

OTHER PUBLICATIONS

Office action issued on Aug. 21, 2023 from Korean Patent Office in a counterpart Korean Patent Application No. 10-2022-0184904 (all the cited references are listed in this IDS.) (English translation is also submitted herewith.).

(Continued)

*Primary Examiner* — Bobbak Safaipour
(74) *Attorney, Agent, or Firm* — The PL Law Group, PLLC

(57) ABSTRACT

A speech video generation device according to an embodiment includes a first encoder that receives an input of a first person background image of a predetermined person partially hidden by a first mask, and extracts a first image feature vector from the first person background image, a second encoder, which receives an input of a second person background image of the person partially hidden by a second mask, and extracts a second image feature vector from the second person background image, a third encoder, which (Continued)

receives an input of a speech audio signal of the person, and extracts a voice feature vector from the speech audio signal, a combining unit, which generates a combined vector of the first image feature vector, the second image feature vector, and the voice feature vector, and a decoder, which reconstructs a speech video of the person using the combined vector as an input.

12 Claims, 6 Drawing Sheets

(58) Field of Classification Search
CPC ...... G06N 3/0464; G06N 3/08; G06N 3/0455; G06N 20/00; G10L 25/30; G10L 21/10; G10L 15/02; G10L 15/04; G10L 21/055; H04N 21/23418; H04N 21/8106; H04N 21/43072; H04N 21/854
See application file for complete search history.

(56) References Cited

U.S. PATENT DOCUMENTS

| | | | |
|---|---|---|---|
| 2022/0351439 A1* | 11/2022 | Chae | G10L 13/027 |
| 2022/0358703 A1* | 11/2022 | Chae | G06T 13/205 |
| 2022/0398793 A1* | 12/2022 | Chae | H04N 19/23 |
| 2022/0399025 A1* | 12/2022 | Chae | G10L 17/14 |

FOREIGN PATENT DOCUMENTS

| | | |
|---|---|---|
| KR | 10-2020-0080681 A | 7/2020 |
| KR | 10-2020-0145700 A | 12/2020 |
| KR | 10-2020-0145701 A | 12/2020 |

OTHER PUBLICATIONS

Amir Jamaludin et al., 'You Said That?: Synthesising Talking Faces from audio', International Journal of Computer Vision, 2019, 127:1767-1779, https://doi.org/10.1007/s11263-019-01150-y.

Office action issued on Dec. 24, 2021 from Korean Patent Office in a counterpart Korean Patent Application No. 10-2020-0107191 (all the cited references are listed in this IDS.) (English translation is also submitted herewith.).

Office action issued on Jun. 20, 2022 from Korean Patent Office in a counterpart Korean Patent Application No. 10-2020-0107191 (all the cited references are listed in this IDS.) (English translation is also submitted herewith.).

Hao Zhu et al, "Arbitrary talking face generation via attentional audio-visual coherence learning", arXiv:181206589v2, (csCV), May 13, 2020.

Parjwal K R et al., "Towards automatic face-to-facetranslation (LipGAN)", Proceedings of the 27th ACM International conference on multimedia, Oct. 2019, pp. 1428-1436.

Lele Chen et al, "Lip movement generation at a glance", Proceedings of the European Conference on Computer Vision (ECCV), 2018.

Jiawen Yang et al, "Classification for Dermoscopy Images Using Convolutional Neural Networks Based on Region Average Pooling", IEEE Access, vol. 6, pp. 65130-65138, Oct. 2018.

Alexandros Koumparoulis et al, "Audio-Assisted Image Inpainting for Talking Faces", ICASSP 2020, May 4, 2020, pp. 7664-7668.

International Search Report for PCT/KR2020/018374 mailed on May 21, 2021.

Vougioukas Konstantinos et al., "Realistic Speech-Driven Facial Animation with GANs", arXiv:1906.06337vl. Jun. 14, 2019. <URL: https://arxiv.org/pdf/1906.0637.pdf>.

* cited by examiner

M1

M2

M2

DEVICE AND METHOD FOR GENERATING SPEECH VIDEO

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/018374, filed Dec. 15, 2020, which claims priority to the benefit of Korean Patent Application No. 10-2020-0107191 filed in the Korean Intellectual Property Office on Aug. 25, 2020, the entire contents of which are incorporated herein by reference.

BACKGROUND

1. Technical Field

Embodiments of the present invention relate to a speech video generation technology based on machine learning.

2. Background Art

Nowadays, with the development of the artificial intelligence technology field, various types of content are generated based on an artificial intelligence technology. For example, when there is a voice message to be delivered, it may be desirable to generate a speech video in which the voice message sounds as if it is uttered by a famous person (e.g., president or the like) so as to attract the attention of people. This is implemented by generating lip shapes or the like suitable for a specific message so that the lip shapes look as if a famous person utters the specific message in a video of the famous person.

To this end, conventionally, a landmark or key point related to a voice is generated from an existing speech video and training for the generated landmark or key point is performed, and thereafter an image suitable for an input voice is synthesized using a trained model. However, in the case of this conventional technology, a process of extracting and converting a key point into a standard space (position oriented frontward from the center of a screen) and inversely converting the same is necessarily required, and a step of synthesizing a key point and a step of synthesizing an image are required, thus causing a complicated procedure.

Meanwhile, in the case of a method that does not use a key point, an image suitable for an input voice is synthesized after cutting off only a face portion and aligning the face portion in size and position. Thus, since a natural motion of a person cannot be reflected, an unnatural result is achieved.

SUMMARY

Disclosed embodiments provide a speech video generation method and device capable of improving quality of a speech video of a predetermined person while smoothly reconstructing the speech video.

A speech video generation device according to a disclosed embodiment is a computing device having one or more processors and a memory which stores one or more programs executed by the one or more processors, the speech video generation device including: a first encoder, which receives an input of a first person background image of a predetermined person partially hidden by a first mask, and extracts a first image feature vector from the first person background image; a second encoder, which receives an input of a second person background image of the person partially hidden by a second mask, and extracts a second image feature vector from the second person background image; a third encoder, which receives an input of a speech audio signal of the person, and extracts a voice feature vector from the speech audio signal; a combining unit, which generates a combined vector by combining the first image feature vector output from the first encoder, the second image feature vector output from the second encoder, and the voice feature vector output from the third encoder; and a decoder, which reconstructs a speech video of the person using the combined vector as an input.

The first person background image and the second person background image may be video parts of the same section in the speech video of the person, and the speech audio signal may be an audio part of the same section as the first person background image and the second person background image in the speech video of the person.

The second mask may be provided so as to hide a smaller region than that of the first mask.

The first mask may be provided so as to hide a maximum region of a speech-related portion of the person in the first person background image, and the second mask may be provided so as to hide a core region of the speech-related portion of the person while hiding a smaller region than that of the first mask in the second person background image.

The second person background image may be provided so that a preset additional information region is viewed while the core region of the speech-related portion of the person is hidden by the second mask.

The second encoder may include: a feature extraction unit, which extracts the second image feature vector from the second person background image; and a compression unit, which compresses the extracted second image feature vector.

The compression unit may calculate a representative value of the second image feature vector for each channel based on the extracted second image feature vector, calculate an image representative feature matrix including, as matrix elements, the representative value of the second image feature vector for each channel, and control a compressed size of the second image feature vector by connecting a fully connected neural network to the image representative feature matrix.

The representative value may be an average value of the second image feature vector for each channel, and the compression unit may calculate the average value of the second image feature vector for each channel through Equation 1 below.

$$f_c = \frac{1}{HW}\sum_{i=1}^{H}\sum_{j=1}^{W} F_{i,j,c} \qquad \text{(Equation 1)}$$

$f_c$: average value of the second image feature vector of a c-th channel
H: height of the second image feature vector
W: width of the second image feature vector
$F_{i,j,c}$: second image feature vector value of a c-th channel at coordinates (i, j)

The compression unit may calculate the image representative feature matrix through Equation 2 below.

$$f = [f_0, \ldots, f_C, \ldots, f_K]^T \qquad \text{(Equation 2)}$$

f: image representative feature matrix
K: the number of channels of the second image feature vector
T: transposed matrix The compressed second image feature vector output from the compression unit may be expressed as Equation 3 below.

$$z = \sigma(Wf + b) \quad \text{(Equation 3)}$$

z: compressed second image feature vector

σ: activation function of the fully connected neural network

W, b: parameters of the fully connected neural network

The speech video generation device may further include a residual block provided between the combining unit and the decoder, wherein the residual block may use the combined vector output from the combining unit as an input value and may be trained to minimize a difference between the input value and an output value output from the residual block.

A speech video generation method according to a disclosed embodiment is performed by a computing device having one or more processors and a memory which stores one or more programs executed by the one or more processors, the speech video generation method including: receiving an input of a first person background image of a predetermined person partially hidden by a first mask, and extracting a first image feature vector from the first person background image; receiving an input of a second person background image of the person partially hidden by a second mask, and extracting a second image feature vector from the second person background image; receiving an input of a speech audio signal of the person, and extracting a voice feature vector from the speech audio signal; generating a combined vector by combining the first image feature vector output from the first encoder, the second image feature vector output from the second encoder, and the voice feature vector output from the third encoder; and reconstructing a speech video of the person using the combined vector as an input.

According to disclosed embodiments, an additional information region is shown while hiding the core region related to a speech through the second mask M2 in the second person background image, whereas the speech-related portion is maximally hidden through the first mask M1 in the first person background image, and thus a shape and motion of an upper body may be accurately reconstructed by sufficiently delivering information about a portion irrelevant to a speech, while improving controllability of a speech audio signal for the speech-related portion in the reconstructed speech video by surely blocking information about the speech-related portion in the person background image. Therefore, a training success rate of a machine learning model may be increased, and quality of a final speech video may be improved.

Furthermore, when determining a shape and size of a mask to be applied to the person background image, it is not necessary to consider details of the speech-related portion, and a simpler criterion may be applied, thus causing low dependency on a sense and judgement of a training operator. Accordingly, preprocessing efficiency of input data may be increased, and possibilities of a training failure and trial and error may be reduced, thus improving overall efficiency.

DETAILED DESCRIPTION

Figure 1:
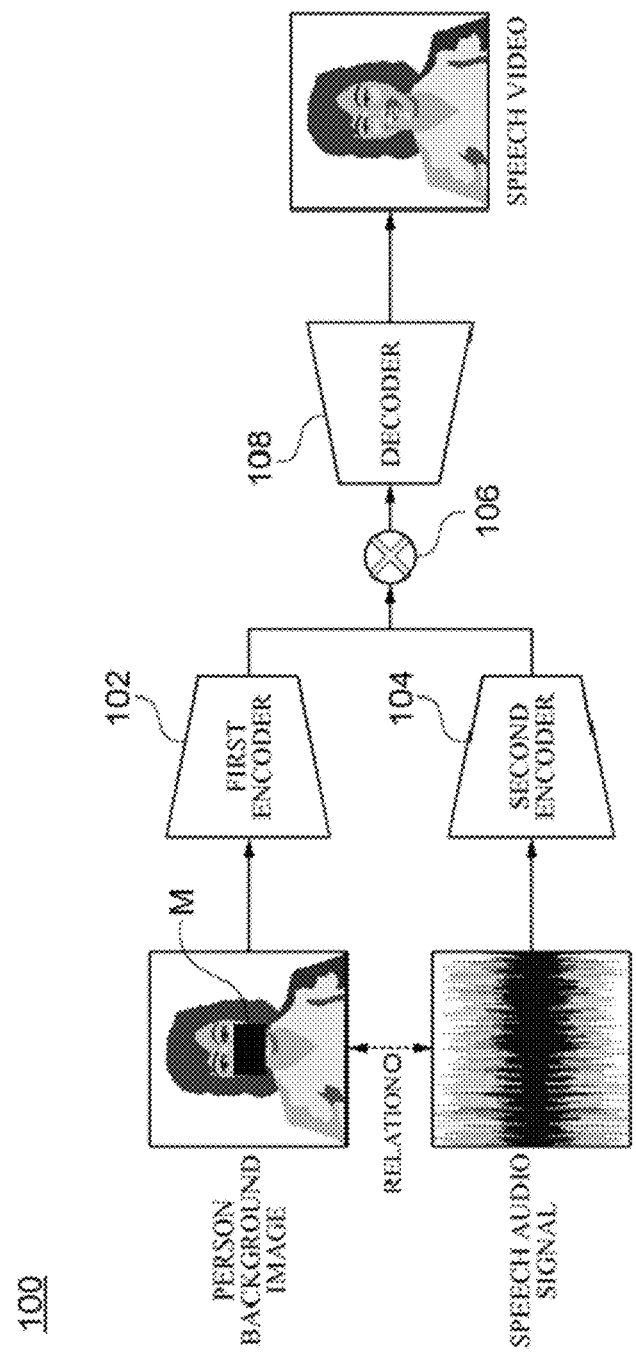
FIG. 1 is a block diagram illustrating a configuration of a speech video generation device according to an embodiment of the present invention.

Hereinafter, specific embodiments of the present invention will be described with reference to the accompanying drawings. The following detailed description is provided to assist in a comprehensive understanding of the methods, devices and/or systems described herein. However, the detailed description is only illustrative, and the present invention is not limited thereto.

In describing embodiments of the present invention, when a specific description of known technology related to the present invention is deemed to make the gist of the present invention unnecessarily vague, the detailed description thereof will be omitted. The terms used below are defined in consideration of functions in the present invention, but may vary in accordance with the customary practice or the intention of a user or an operator. Therefore, the terms should be defined based on whole content throughout the present specification. The terms used herein are only for describing the embodiments of the present invention, and should not be construed as limitative. A singular expression includes a plural meaning unless clearly used otherwise. In the present description, expressions such as "include" or "have" are for referring to certain characteristics, numbers, steps, operations, components, some or combinations thereof, and should not be construed as excluding the presence or possibility of one or more other characteristics, numbers, steps, operations, components, some or combinations thereof besides those described.

In the following description, the terms "transmission", "communication", and "reception" of a signal or information and other similar terms may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same applies to "reception" of the signal or information. In addition, in the present specification, a meaning in which two or more pieces of data or information are "related" indicates that when any one piece of data (or information) is obtained, at least a portion of other data (or information) may be obtained based thereon.

Directional terms such as "upper side", "lower side", "one side", and "other side" are used in relation to the orientations in the disclosed drawings. Since components of the embodiments of the present invention may be positioned in various orientations, the directional terms are merely illustrative and do not limit the components.

Furthermore, the terms "first", "second" and the like may be used for describing various elements, but the elements should not be construed as being limited by the terms. These terms may be used for distinguishing one element from another element. For example, a first element could be termed a second element and vice versa without departing from the scope of the present invention.

FIG. 1 is a block diagram illustrating a configuration of a speech video generation device according to an embodiment of the present invention. Referring to FIG. 1, a speech video generation device 100 may include a first encoder 102, a second encoder 104, a combining unit 106, and a decoder 108.

The configuration of the speech video generation device 100 illustrated in FIG. 1 shows functional elements that are functionally differentiated, wherein the functional elements may be functionally connected to each other to perform functions according to the present invention, and one or more elements may be actually physically integrated.

In an example embodiment, the speech video generation device 100 may be implemented with a convolutional neural network (CNN)-based machine learning technology, but is not limited thereto, and other various machine learning technologies may be applied. The following description is provided with a focus on a learning process for generating a speech video.

The first encoder 102 may be a machine learning model trained to extract an image feature vector using a person background image as an input. Hereinafter, the term "vector" may also be used to refer to a "tensor".

Here, the person background image input to the first encoder 102 is an image in which a person utters (speaks). In an example embodiment, the person background image may be an image including a face and upper body of a person. That is, the person background image may be an image including not only a face but also an upper body so as to show motions of the face, neck, and shoulder of the person when the person utters, but is not limited thereto.

A portion related to a speech in the person background image input to the first encoder 102 may be masked. That is, a portion (e.g., a mouth and a portion around the mouth) related to a speech in the person background image may be hidden by a mask M. Furthermore, during a masking process, portions related to a face motion, neck motion, and shoulder motion due to a person's speech may not be masked in the person background image. In this case, the first encoder 102 extracts an image feature vector of a portion excluding the portion related to a speech in the person background image.

In an example embodiment, the first encoder 102 may include at least one convolutional layer and at least one pooling layer. The convolutional layer, while moving a filter of a preset size (e.g., 3×3 pixel size) at a fixed interval in the input person background image, may extract a feature value of pixels corresponding to the filter. The pooling layer may receive an output from the convolutional layer as an input and may perform down sampling thereon.

The second encoder 104 may be a machine learning model trained to extract a voice feature vector using a speech audio signal as an input. Here, the speech audio signal corresponds to an audio part in the person background image (i.e., an image in which a person utters) input to the first encoder 102. In other words, a video part in a video in which a person utters may be input to the first encoder 102, and an audio part may be input to the second encoder 104. In an example embodiment, the second encoder 104 may include at least one convolutional layer and at least one pooling layer, but a neural network structure of the second encoder 104 is not limited thereto.

The person background image input to the first encoder 102 and the speech audio signal input to the second encoder 104 may be synchronized in time. That is, in a section of the same time band in a video in which a person utters, a video may be input to the first encoder 102, and an audio may be input to the second encoder 104. Here, the person background image and the speech audio signal may be input to the first encoder 102 and the second encoder 104 every preset unit time (e.g., one frame or a plurality of successive frames).

The combining unit 106 may generate a combined vector by combining the image feature vector output from the first encoder 102 and the voice feature vector output from the second encoder 104. In an example embodiment, the combining unit 106 may generate the combined vector by concatenating the image feature vector and the voice feature vector, but the present invention is not limited thereto, and the combining unit 106 may generate the combined vector by combining the image feature vector and the voice feature vector in other various manners.

The decoder 108 may reconstruct a speech video of a person using the combined vector output from the combining unit 106 as an input. In detail, the decoder 108 may be a machine learning model trained to reconstruct a portion (i.e., a portion related to a speech) hidden by the mask M of the image feature vector (i.e., a feature of a video part, in which the speech-related portion is hidden by the mask, in a video in which a person utters) output from the first encoder 102, based on the voice feature vector (i.e., a feature of an audio part in the video in which a person utters) output from the second encoder 104. That is, the decoder 108 may be a model trained to reconstruct a masked region using an audio signal, when a portion related to a speech is masked in the person background image.

In an example embodiment, the decoder 108 may generate a speech video by performing up sampling after performing deconvolution on the combined vector obtained by combining the image feature vector output from the first encoder 102 and the voice feature vector output from the second encoder 104.

The decoder 108 may compare a generated speech video with an original speech video (i.e., a correct value), and may adjust a learning parameter (e.g., a loss function, a softmax function, etc.) so that the generated speech video (i.e., a video in which a speech-related portion has been reconstructed through an audio part) approximates to the original speech video.

Figure 2:
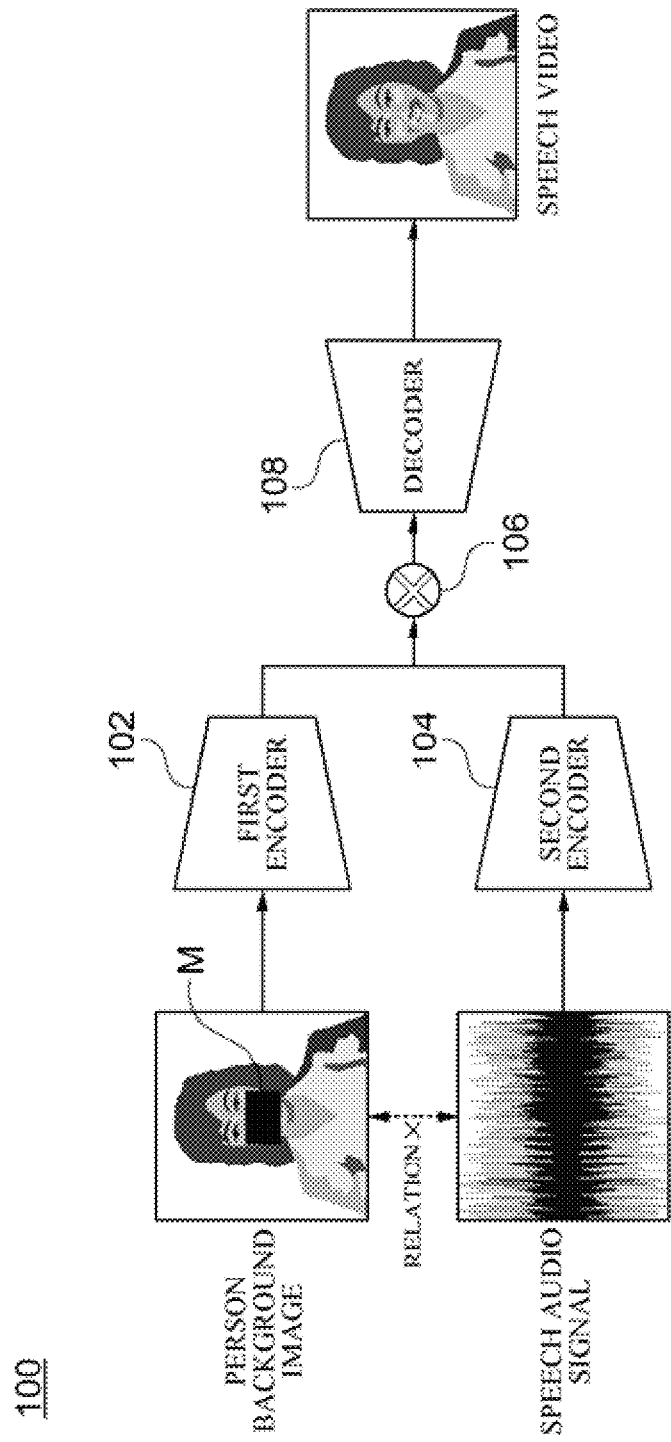
FIG. 2 is a diagram illustrating a state in which a speech video is inferred through a speech video generation device according to an embodiment of the present invention.

FIG. 2 is a diagram illustrating a state in which a speech video is inferred through a speech video generation device according to an embodiment of the present invention.

Referring to FIG. 2, the first encoder 102 receives an input of a person background image. Here, the person background image may be one used in a learning process. The person background image may be an image including a face and upper body of a person. Furthermore, in the person background image, a portion related to a speech may be hidden by the mask M. The first encoder 102 may extract an image feature vector from the person background image.

The second encoder 104 receives an input of a speech audio signal. Here, the speech audio signal may not be related to the person background image input to the first encoder 102. For example, the speech audio signal may be a speech audio signal of a person different from the person in the person background image. However, the speech audio signal is not limited thereto, and may be one uttered by the person in the person background image. Here, the speech of the person may be one uttered in a situation or background not related to the person background image. The second encoder 104 may extract a voice feature vector from the speech audio signal.

The combining unit 106 may generate a combined vector by combining the image feature vector output from the first encoder 102 and the voice feature vector output from the second encoder 104.

The decoder 108 may reconstruct and output a speech video using the combined vector as an input. That is, the decoder 108 may generate the speech video by reconstructing a speech-related portion of the person background image based on the voice feature vector output from the second encoder 104. In this case, although the speech audio signal input to the second encoder 104 is a speech not related to the person background image (e.g., although the speech audio signal was not uttered by the person in the person background image), the speech video is generated as if the person in the person background image utters.

According to a disclosed embodiment, since learning is performed using a person background image including a face and upper body as an input in a state in which a speech-related portion is masked, a speech video may be generated by reflecting a unique gesture or feature of a person such as a face motion, neck motion, and shoulder motion shown when the person speaks, and thus a more smooth speech video may be generated.

Furthermore, a video part in the speech video is input to the first encoder 102 and an audio part is input to the second encoder 104, and a speech-related portion that has been masked is reconstructed from an audio, and thus a speech video may be generated through a single neural network model without an additional key point prediction process.

Furthermore, since a speech video including not only a face but also an upper body is generated, another body part (e.g., a trunk, arms, legs, etc.) of the corresponding person may be smoothly pasted in without an additional conversion or synthesis process.

Meanwhile, in order to generate a more efficient and smooth speech video in the embodiment illustrated in FIG. 1, it is necessary to preserve information irrelevant to a speech, such as an upper body position, motion, and surface texture of an upper body of a corresponding person, as much as possible while removing a speech-related portion as much as possible from a person background image through a mask. Thus, another disclosed embodiment resolves this issue by using two person background images as an input.

Figure 3:
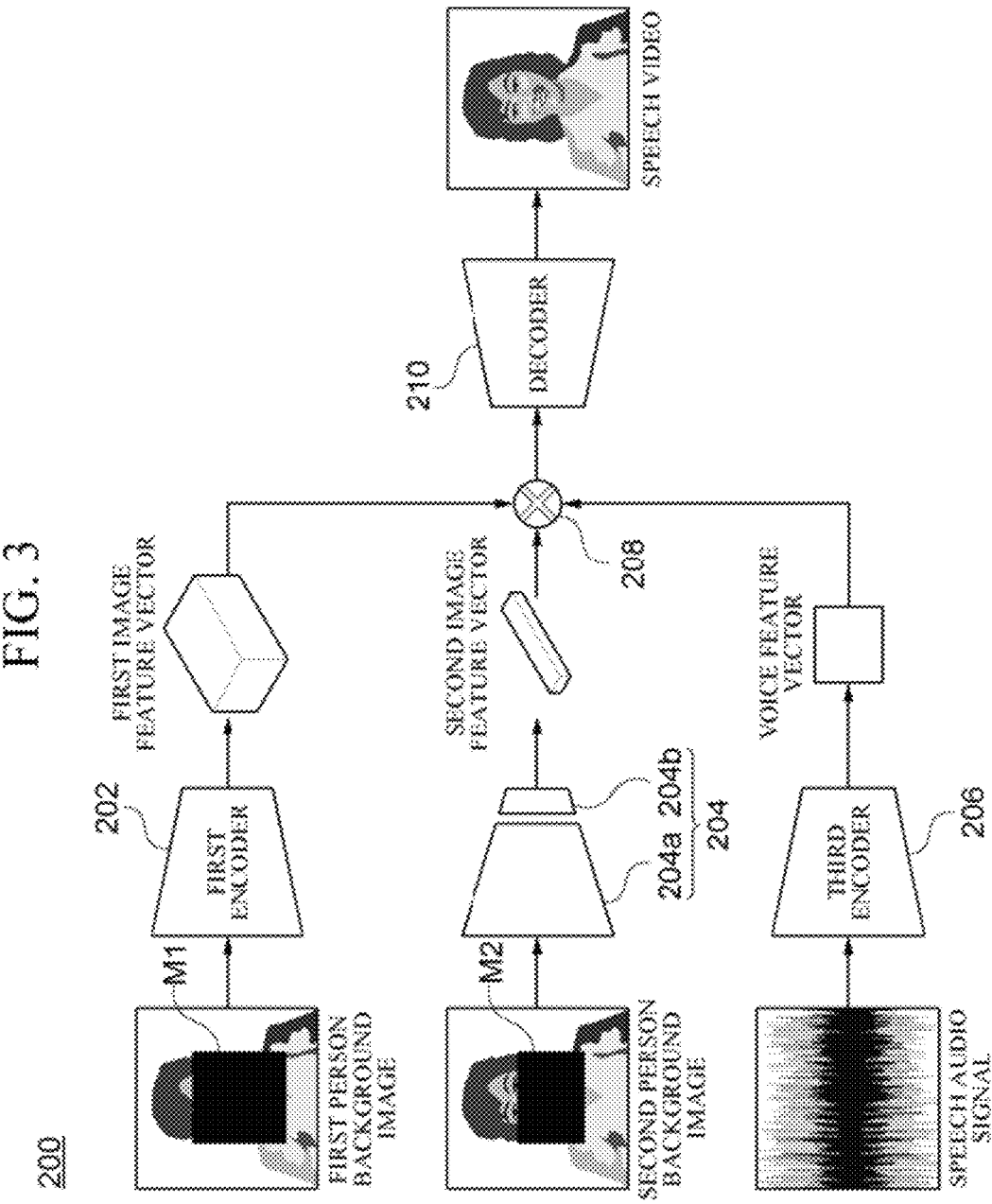
FIG. 3 is a diagram illustrating a configuration of a speech video generation device according to another embodiment of the present invention.

FIG. 3 is a diagram illustrating a configuration of a speech video generation device according to another embodiment of the present invention.

Referring to FIG. 3, a speech video generation device 200 may include a first encoder 202, a second encoder 204, a third encoder 206, a combining unit 208, and a decoder 210.

The first encoder 202 may be a machine learning model trained to extract a first image feature vector using a first person background image as an input. Here, the first person background image may be masked through a first mask M1. The first mask M1 may be provided so as to maximally hide a speech-related portion of a speech of the corresponding person in the first person background image.

That is, the first mask M1 may be provided so as to hide a maximum region of the speech-related portion in the first person background image. In an example embodiment, the first mask M1 may be provided so as to hide eyebrows up to a collarbone portion of the corresponding person in the first person background image.

The first encoder 202 may extract a first image feature vector having a form that holds space and texture information so as to maximally preserve a basic frame of an upper body of the corresponding person in the first person background image. For example, the first image feature vector may have a tensor form of (height, width, channel). The first image feature vector has a tensor form of (height, width, channel), but is referred to as a first image feature vector below for convenience.

The second encoder 204 may be a machine learning model trained to extract a second image feature vector using a second person background image as an input. Here, the second person background image may be the same as the first person background image except for a masking region. That is, the first person background image and the second person background image, which are video parts in a speech video of a predetermined person, may be video parts of the same section.

The second person background image may be masked through a second mask M2. The second mask M2 may differ in masking region from the first mask M1. The second mask M2 may be provided so as to hide a smaller region than that of the first mask M1 in the second person background image.

In an example embodiment, the second mask M2 may be provided so as to hide a core region (e.g., a lip part and chin part of a corresponding person) of a speech-related portion of the corresponding person while hiding a smaller region than that of the first mask M1 in the second person background image.

The second person background image may be provided so that a preset additional information region is viewed (i.e., not hidden) while the core region of the speech-related portion of the corresponding person is hidden. Here, the preset additional information region may be a region hidden by the first mask M1 in the first person background image.

Figure 4A:
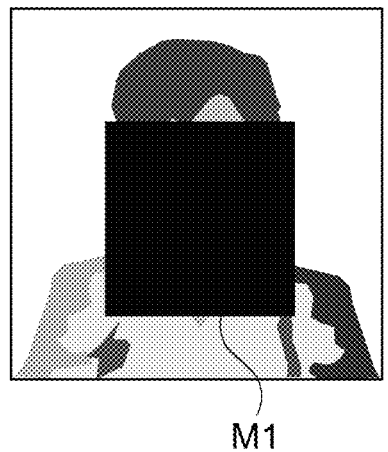
FIGS. 4A, 4B and 4C are diagrams illustrating various examples of a second person background image in comparison with a first person background image in a speech video generation device according to another embodiment of the present invention.
Figure 4B:
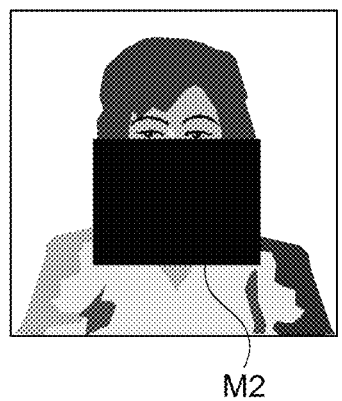
Figure 4C:
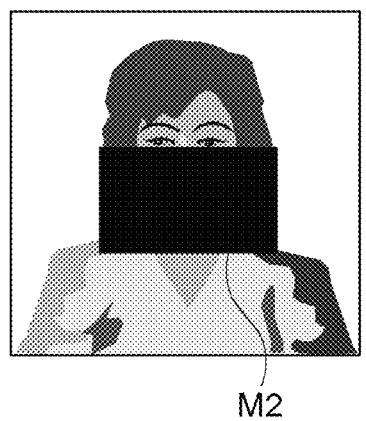

FIGS. 4A, 4B, and 4C are diagrams illustrating various examples of a second person background image in comparison with a first person background image in a speech video generation device according to another embodiment of the present invention.

Referring to FIG. 4A, the first mask M1 hides eyebrows up to a collarbone portion of the corresponding person in the first person background image.

Referring to FIG. 4B, the second mask M2 hides a portion below eyes up to a portion above a collarbone of the corresponding person in the second person background image. Here, it may be recognized that the second mask M2 is provided so as not to hide an additional information region of an eye part, eyebrow part, and collarbone part while hiding a core region (e.g., a lip part and chin part of a corresponding person) of the speech-related portion of the corresponding person.

Referring to FIG. 4C, it may be recognized that in the second person background image, the second mask M2 is provided so as not to hide an additional information region of an eye part and eyebrow part while hiding a core region (e.g., a lip part and chin part of a corresponding person) of the speech-related portion of the corresponding person.

Besides, in the second person background image, the second mask M2 may be provided so as not to hide an additional information region such as an ear part, an eyebrow part, or the like while hiding the core region of the speech-related portion of the corresponding person.

Referring back to FIG. 3, the second encoder 204 may be provided as a bottleneck structure so as to be prevented from encoding secondary speech information (e.g., change in wrinkles below eyes or beside a nose) while encoding non-speech portion information (e.g., facial contour, skin tone, eye shape, eye blinking, eyebrow movement, neck and shoulder joint part, etc.) of the person included in the second person background image when encoding the second person background image.

Here, during a process of encoding the second person background image, the second encoder 204 may be induced to remove the secondary speech information by increasing a compression ratio. That is, in the second encoder 204, a bottleneck-type neural network may be configured at a rear stage of the encoder so that the second encoder 204 may be prevented from encoding the secondary speech information while encoding the non-speech portion information in the second person background image. The first encoder 202 and the second encoder 204 may partially share a neural network structure.

In an example embodiment, the second encoder 204 may include a feature extraction unit 204a and a compression unit 204b. The feature extraction unit 204a may extract the second image feature vector from the second person background image. The feature extraction unit 204a may employ a plurality of two-dimensional convolutional neural network layers, and may extract a down-sampled second image feature vector through a convolutional scheme such as stride, dilation, or the like. The second image feature vector extracted by the feature extraction unit 204a may have a tensor form of (height, width, channel).

The compression unit 204b may compress the second image feature vector extracted by the feature extraction unit 204a. In an example embodiment, the compression unit 204b may spatially compress the second image feature vector having a form of (height, width, channel) (i.e., tensor form) into a vector having a form of (height, width). The compression unit 204b may reduce a size of the second image feature vector by applying pooling (e.g., average pooling or max pooling) to the second image feature vector.

In detail, the compression unit 204b may calculate a representative value of the second image feature vector for each channel. The representative value, for example, may include an average value, a maximum value, or the like. In an example embodiment, the compression unit 204b may derive an average value of the second image feature vector for each channel through Equation 1 below.

$$f_c = \frac{1}{HW}\sum_{i=1}^{H}\sum_{j=1}^{W} F_{i,j,c}$$ (Equation 1)

$f_c$: average value of the second image feature vector of a c-th channel
H: height of the second image feature vector
W: width of the second image feature vector
$F_{i,j,c}$: second image feature vector value of a c-th channel at coordinates (i, j)

Furthermore, the compression unit 204b may calculate an image representative feature matrix based on the representative value of the second image feature vector for each channel. The compression unit 204b may calculate the image representative feature matrix including, as matrix elements, the representative value of the second image feature vector for each channel. The compression unit 204b may derive the image representative feature matrix through Equation 2 below.

$$f = [f_0, \ldots, f_C, \ldots, f_K]^T$$ (Equation 2)

f: image representative feature matrix
K: the number of channels of the second image feature vector
T: transposed matrix The compression unit 204b may control a compressed size of the second image feature vector by connecting a fully connected neural network to the image representative feature matrix. The compressed second image feature vector output from the compression unit 204b may be expressed as Equation 3 below.

$$z = \sigma(Wf+b)$$ (Equation 3)

z: compressed second image feature vector
σ: activation function of the fully connected neural network
W, b: parameters of the fully connected neural network The activation function σ may employ a nonlinear function such as Sigmoid, Tanh, Relu, or the like. Furthermore, the parameter W may be $W \in \mathbb{R}^{N \times K}$, and the parameter b may be $b \in \mathbb{R}^{N}$. R may denote a real number, and N may denote a length of the compressed second image feature vector.

The third encoder 206 may be a machine learning model trained to extract a voice feature vector using a speech audio signal as an input. Here, the speech audio signal may correspond to an audio part in a speech video of a predetermined person.

The combining unit 208 may generate a combined vector by combining the first image feature vector output from the first encoder 202, the second image feature vector output from the second encoder 204, and the voice feature vector output from the third encoder 206.

In an embodiment, the combining unit 208 may generate the combined vector by concatenating the second image feature vector to a channel axis after multiplying the first image feature vector and the voice feature vector. In another embodiment, the combining unit 208 may generate the combined vector by concatenating all of the first image feature vector, the second image feature vector, and the voice feature vector. In another embodiment, the combining unit 208 may generate the combined vector by concatenating the first image feature vector and the second image feature vector and then multiplying the voice feature vector. However, the combining unit 208 is not limited thereto, and may generate the combined vector in various manners.

The decoder 210 may be a machine learning model trained to reconstruct a speech video of a person using the combined vector output from the combining unit 208 as an input. The decoder 210 may compare a reconstructed speech video with an original speech video, and may adjust a learning parameter (e.g., a loss function, a softmax function, etc.) so that the reconstructed speech video approximates to the original speech video.

According to disclosed embodiments, an additional information region is shown while hiding the core region related to a speech through the second mask M2 in the second person background image, whereas the speech-related portion is maximally hidden through the first mask M1 in the first person background image, and thus a shape and motion of an upper body may be accurately reconstructed by sufficiently delivering information about a portion irrelevant to a speech, while improving controllability of a speech audio signal for the speech-related portion in the reconstructed speech video by surely blocking information about the speech-related portion in the person background image. Therefore, a training success rate of a machine learning model may be increased, and quality of a final speech video may be improved.

Furthermore, when determining a shape and size of a mask to be applied to the person background image, it is not necessary to consider details of the speech-related portion, and a simpler criterion may be applied, thus causing low dependency on a sense and judgement of a training operator. Accordingly, preprocessing efficiency of input data may be increased, and possibilities of a training failure and trial and error may be reduced, thus improving overall efficiency.

Figure 5:
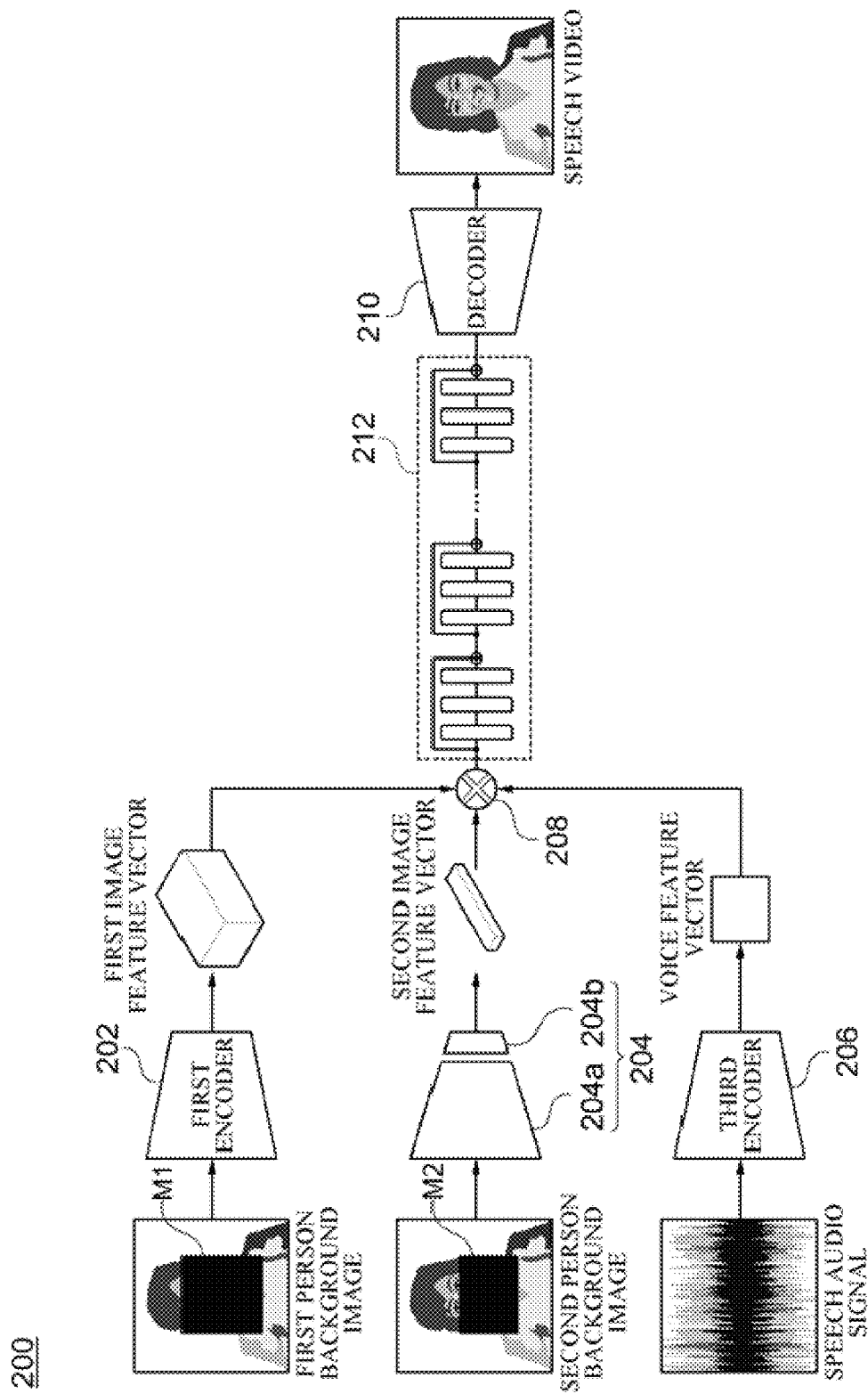
FIG. 5 is a diagram illustrating a configuration of a speech video generation device according to another embodiment of the present invention.

FIG. 5 is a diagram illustrating a configuration of a speech video generation device according to another embodiment of the present invention. Hereinafter, differences with the embodiment illustrated in FIG. 3 will be mainly described.

Referring to FIG. 5, a speech video generation device 200 may further include a residual block 212. At least one of the residual block 212 may be provided between the combining unit 208 and the decoder 210. In an example embodiment, a plurality of the residual blocks 212 may be sequentially connected (in series) between the combining unit 208 and the decoder 210.

The residual block 212 may include at least one convolutional layer. The residual block 212 may have a structure for performing convolution on an input value (i.e., combined vector output from the combining unit 208) and adding the input value to a result value of the convolution. The residual block 212 may learn minimization between an input value and output value of the residual block 212. In this manner, the first image feature vector, the second image feature vector, and the voice feature vector may be organically combined and used as an input for the decoder 210.

Figure 6:
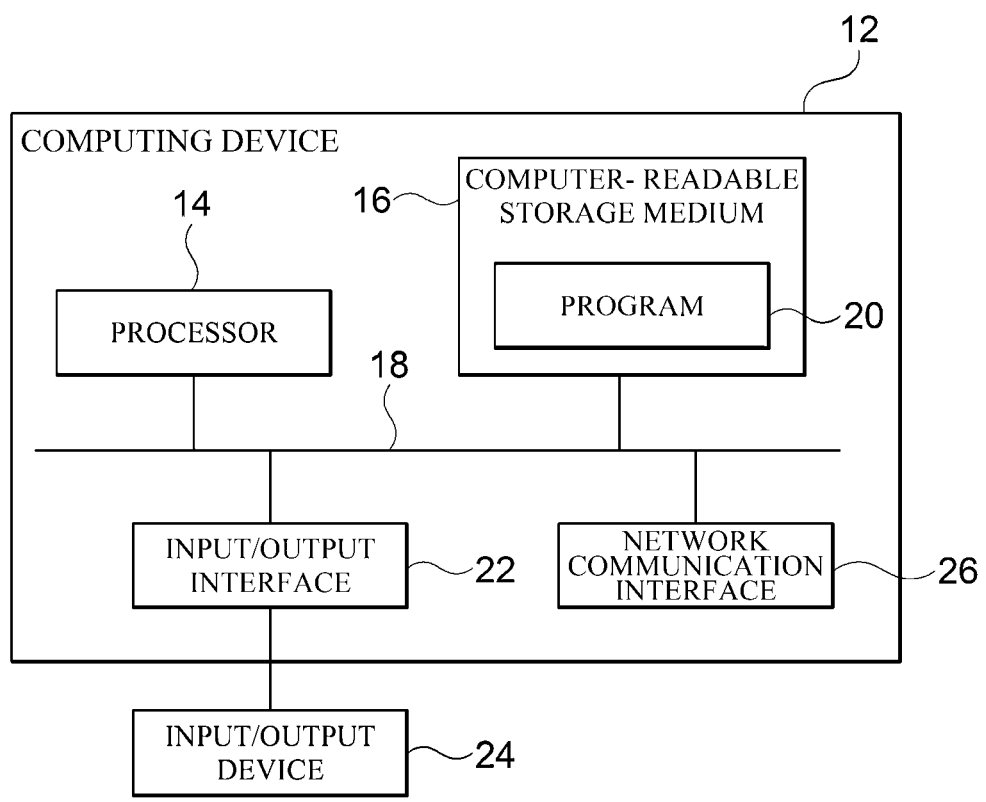
FIG. 6 is a block diagram illustrating a computing environment that includes a computing device suitable for use in example embodiments.

FIG. 6 is a block diagram illustrating a computing environment 10 that includes a computing device suitable for use in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech video generation device 100 or 200.

The computing device 12 includes at least one processor 14, a computer-readable storage medium 16, and a communication bus 18. The processor 14 may cause the computing device 12 to operate according to the above-described example embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the example embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The example input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The example input/output device 24 may be included inside the computing device 12 as a component constituting the computing device 12, or may be connected to the computing device 12 as a separate device distinct from the computing device 12.

Although the representative embodiments of the present invention have been described in detail as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

What is claimed is:

1. A speech video generation device that is a computing device having one or more processors and a memory which stores one or more programs executed by the one or more processors, the speech video generation device comprising:
    a first encoder, which receives an input of a first person background image of a predetermined person partially hidden by a first mask, and extracts a first image feature vector from the first person background image;
    a second encoder, which receives an input of a second person background image of the person partially hidden by a second mask, and extracts a second image feature vector from the second person background image;
    a third encoder, which receives an input of a speech audio signal of the person, and extracts a voice feature vector from the speech audio signal;
    a combining unit, which generates a combined vector by combining the first image feature vector output from the first encoder, the second image feature vector output from the second encoder, and the voice feature vector output from the third encoder; and
    a decoder, which reconstructs a speech video of the person using the combined vector as an input.

2. The speech video generation device of claim 1, wherein the first person background image and the second person background image are video parts of the same section in the speech video of the person; and
    the speech audio signal is an audio part of the same section as the first person background image and the second person background image in the speech video of the person.

3. The speech video generation device of claim 2, wherein the second mask is provided so as to hide a smaller region than that of the first mask.

4. The speech video generation device of claim 3, wherein the first mask is provided so as to hide a maximum region of a speech-related portion of the person in the first person background image; and
the second mask is provided so as to hide a core region of the speech-related portion of the person while hiding a smaller region than that of the first mask in the second person background image.

5. The speech video generation device of claim 4, wherein the second person background image is provided so that a preset additional information region is viewed while the core region of the speech-related portion of the person is hidden by the second mask.

6. The speech video generation device of claim 3, wherein the second encoder comprises:
a feature extraction unit, which extracts the second image feature vector from the second person background image; and
a compression unit, which compresses the extracted second image feature vector.

7. The speech video generation device of claim 6, wherein the compression unit calculates a representative value of the second image feature vector for each channel based on the extracted second image feature vector, calculates an image representative feature matrix including, as matrix elements, the representative value of the second image feature vector for each channel, and controls a compressed size of the second image feature vector by connecting a fully connected neural network to the image representative feature matrix.

8. The speech video generation device of claim 7, wherein the representative value is an average value of the second image feature vector for each channel; and
the compression unit calculates the average value of the second image feature vector for each channel through Equation 1 below:

$$f_c = \frac{1}{HW}\sum_{i=1}^{H}\sum_{j=1}^{W} F_{i,j,c}$$ [Equation 1]

where $f_c$: average value of the second image feature vector of a c-th channel;
H: height of the second image feature vector;
W: width of the second image feature vector; and
$F_{i,j,c}$: second image feature vector value of a c-th channel at coordinates (i, j).

9. The speech video generation device of claim 8, wherein the compression unit calculates the image representative feature matrix through Equation 2 below:

$$f = [f_0, \ldots f_C, \ldots f_K]^T$$ (Equation 2)

where f: image representative feature matrix;
K: the number of channels of the second image feature vector; and
T: transposed matrix.

10. The speech video generation device of claim 9, wherein the compressed second image feature vector output from the compression unit is expressed as Equation 3 below:

$$z = \sigma(Wf+b)$$ (Equation 3)

where z: compressed second image feature vector;
σ: activation function of the fully connected neural network; and
W, b: parameters of the fully connected neural network.

11. The speech video generation device of claim 1, further comprising:
a residual block provided between the combining unit and the decoder,
wherein the residual block uses the combined vector output from the combining unit as an input value and is trained to minimize a difference between the input value and an output value output from the residual block.

12. A speech video generation method performed by a computing device having one or more processors and a memory which stores one or more programs executed by the one or more processors, the speech video generation method comprising:
receiving an input of a first person background image of a predetermined person partially hidden by a first mask, and extracting a first image feature vector from the first person background image;
receiving an input of a second person background image of the person partially hidden by a second mask, and extracting a second image feature vector from the second person background image;
receiving an input of a speech audio signal of the person, and extracting a voice feature vector from the speech audio signal;
generating a combined vector by combining the first image feature vector output from a first encoder, the second image feature vector output from a second encoder, and the voice feature vector output from a third encoder; and
reconstructing a speech video of the person using the combined vector as an input.

* * * * *